INVENTOR.
FREDERICK M. POTTER
BY
ATTORNEY

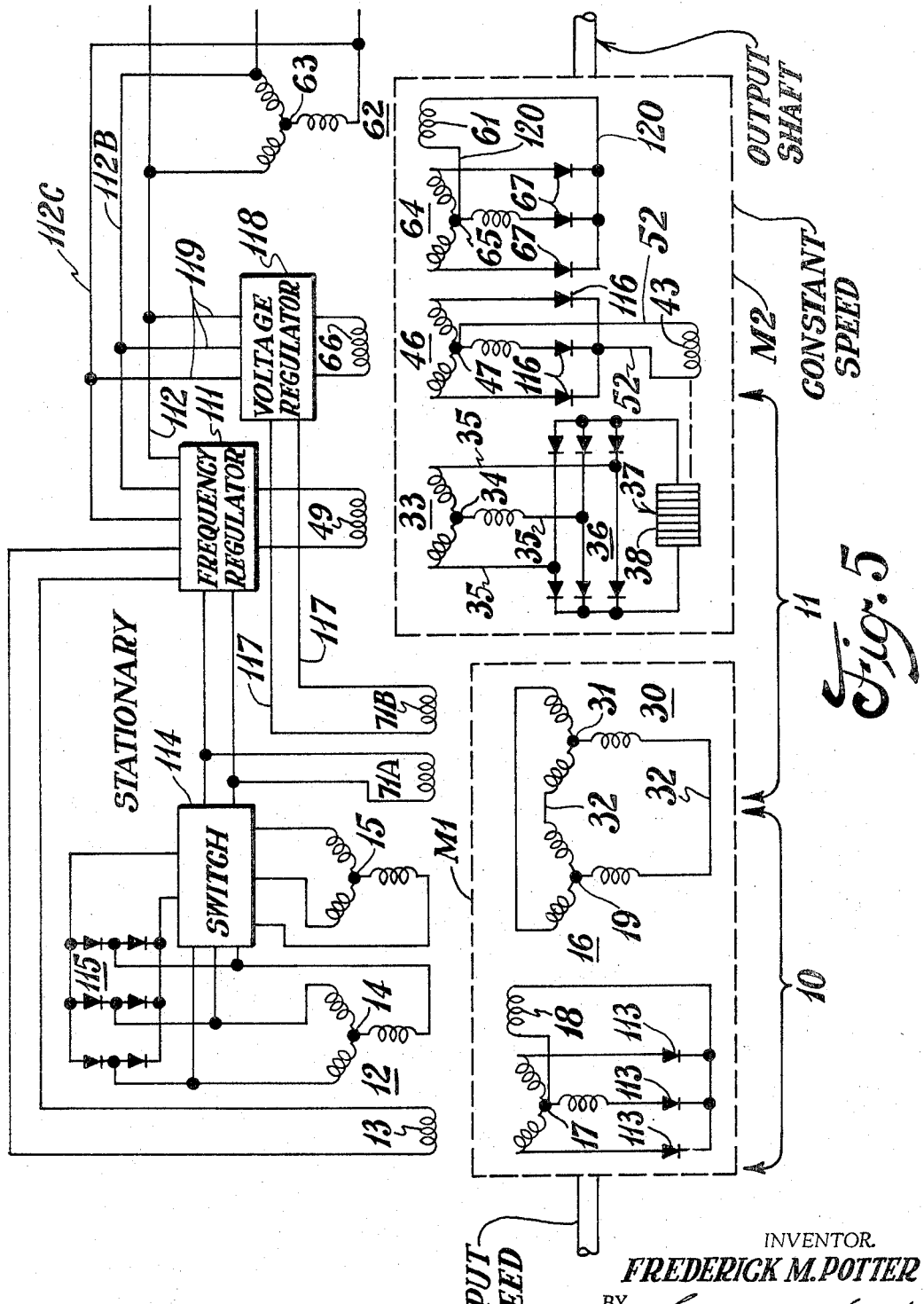

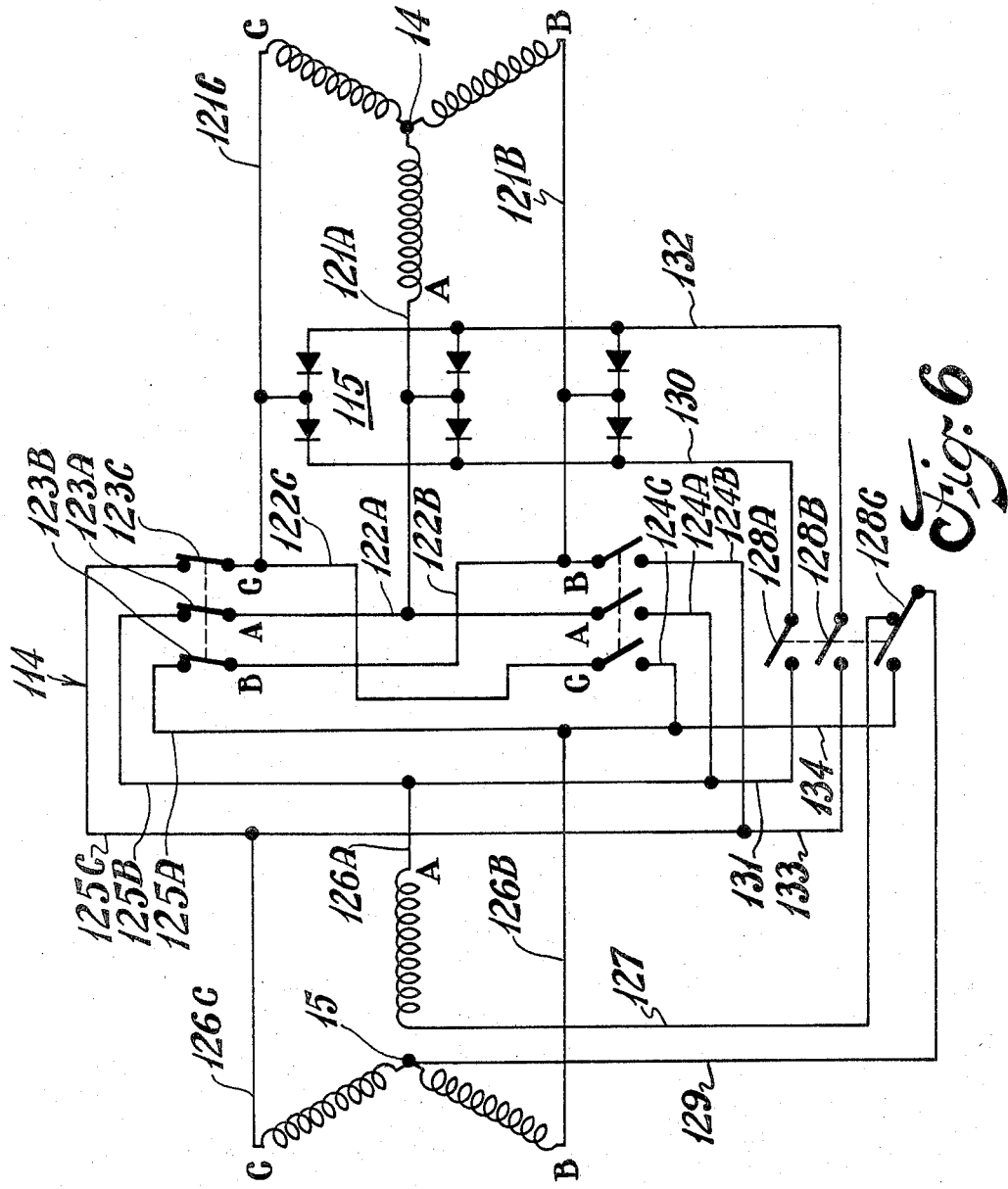

United States Patent Office 3,378,756
Patented Apr. 16, 1968

3,378,756
VARIABLE SPEED CONSTANT FREQUENCY
GENERATING SYSTEM
Frederick M. Potter, Little Silver, N.J., assignor to The
Bendix Corporation, Eatontown, N.J., a corporation of
Delaware
Filed June 18, 1965, Ser. No. 465,003
26 Claims. (Cl. 322—32)

ABSTRACT OF THE DISCLOSURE

A constant frequency generating system in which an induction machine is provided with a frequency determined by driving speed to reduce slip losses to a minimum in providing a constant output speed therefrom.

---

The present invention relates to constant output speed devices, with particular application to dynamoelectric machines, and still more particularly to an electric constant-frequency generating system.

It is desirable in many applications to obtain a constant output speed from a variable speed source, such as an aircraft engine or other variable speed prime mover, for the purpose, for example, of producing a constant output frequency from a dynamoelectric machine, such, for example, as an A.C. generator. This is particularly important in aircraft applications, where much of the instrumentation depends upon having a constant-frequency electric power source. Heretofore various constant speed drives have been utilized. However, they are all quite complex, bulky, difficult to control and require extensive and costly maintenance. Another method of produce constant speed is using the principle of an eddy current slip device. In such instances, the variable speed source, such as an engine, would drive an eddy current slip device whose load would be controlled to produce enough slip to hold the output speed (and driven generator speed) nearly constant. As utilized in the past, it was necessary that the generator have an operating speed lower than the lowest engine speed unless the extra weight and complication of gearing were used. As the engine speed would increase, the slip of the eddy current device would be increased to maintain the generator at a constant speed. It is apparent that this arrangement will produce large losses. As an example, with a 2:1 engine speed range, at maximum speed as much power will be dissipated in slip as is being generated.

The present invention overcomes these disadvantages by the use of an induction device which permits an output speed and a generator speed greater than the highest speed of the engine, without gearing. By supplying the induction device with the proper frequency to determined by the engine speed, the slip is held to a minimum. This arrangement provides a constant frequency over a wide range of input speeds and holds slip losses to a minimum. Further all electrical connections are made between parts which are stationary or are rotated on the same shaft, thus eliminating all brushes.

Thus the present invention provides a brushless constant speed or constant-frequency generator system from a variable-speed driving source in which the slip losses are held to a minimum.

It is an object of the invention to provide a novel dynamoelectric machine.

Another object of the invention is to provide a novel constant frequency generating system.

Another object of the invention is to provide improved means for providing a constant-frequency or constant-speed output from a variable speed input.

Another object of the invention is to provide a constant-frequency generator system that is easy to maintain.

A further object of the invention is to provide a constant-frequency generator system that will provide a long time between required overhauls.

The above and other objects and features of the invention will appear more fully hereinafter from a consideration of the following description taken in connection with the accompanying drawings wherein one example is illustrated by way of example.

In the drawings:

FIGURE 4 is a sectional view of a portion of the housing of the device of FIGURE 2.

FIGURE 5 is a schematic circuit diagram of the device of FIGURE 2.

FIGURE 6 is a schematic circuit diagram of the frequency-selector switch.

Figure 1:
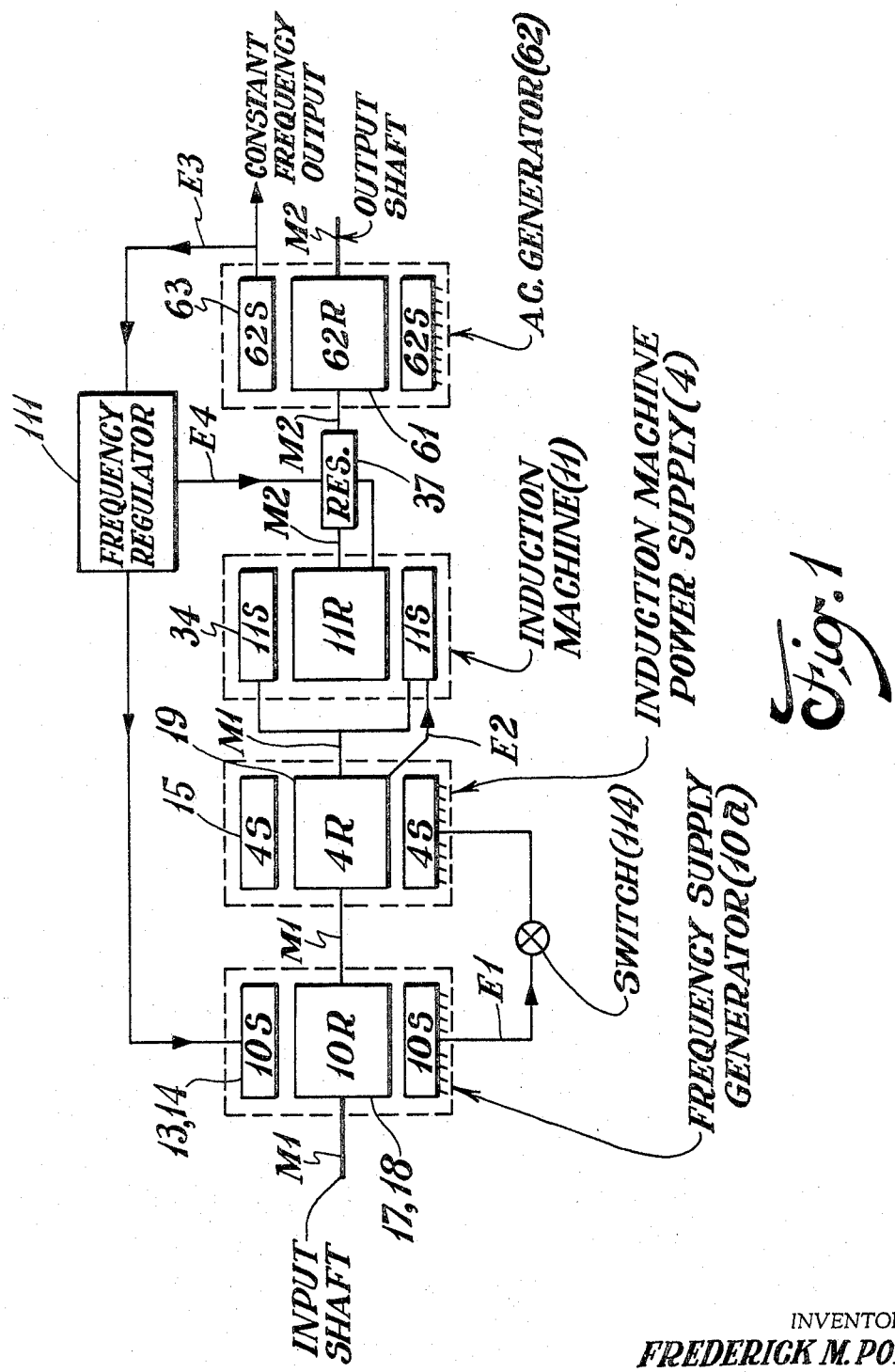
FIGURE 1 is a simplified block diagram illustrating the invention.

Reference is now made to FIGURE 1 of the drawing wherein there is shown in block diagram a constant-frequency generating system embodying the invention. Basically the system is made up of four elements, an A.C. output generator 62, a wound-rotor induction machine 11, a rotatable transformer power supply device 4 for the induction machine 11, and an input generator 10a. The power supply device 4 and generator 10a together form a frequency supply generator 10. Each of these four elements has a stator portion designated generally by S and a rotor portion designated by R. As described in more detail below, input generator 10a has fixed stator windings 13 and 14 and rotating rotor windings 17 and 18; the power-supply device 4 has a rotating rotor winding 19 and a fixed stator winding 15; induction machine 11 has a rotating stator winding 31 and an independently rotating rotor winding 34; an output generator 62 has a rotating rotor winding 61 and a fixed stator winding 63. While the input generator 10a is shown separate from the power supply device 4, in the form described in more detail below these two units are combined into a single frequency supply generator having a multi-winding stator and a multi-winding rotor.

The input generator 10a has its rotor R driven by a variable speed input shaft M1. The output E1 taken from the fixed stator winding 14 of the input generator 10a is connected through a switch 114 to the stator S of power supply device for the induction machine, 11. The input generator 10a, as will be explained in detail later, supplies different frequencies for different input speed ranges. The switch 114 selects the proper frequency for the speed range, preferably automatically in response to the input speed.

The power-supply device 4 for the induction machine is also driven by the variable-speed input shaft M1. The output E2 from the power-supply rotor winding 19 is connected to the stator winding 31 of the wound-rotor induction machine 11. The stator S of the wound-rotor induction machine 11 is also driven by the input shaft M1. The rotor R of the induction machine 11 drives the A.C. output generator 62 through the constant-speed output shaft M2. An output frequency signal E3 is connected to a frequency regulator 111 which provides control power E4 to regulate a variable resistor 37 to control the speed of the wound-rotor induction machine 11. The resistor 37 is connected to the induction machine rotor winding 31 by connection E6 to serve as a load on the induction machine. Also the frequency regulator 111 preferably (but optionally) provides a control signal E5 to set the excitation level of the input generator 10a for additional speed control and maximum efficiency.

The basic mechanical layout will be clear from FIGURE 1. The rotors 10R and 4R for the frequency-supply generator 10a and the power supply device 4 for the induction machine 11 are mounted for rotation on the variable-speed input shaft M1. Also mounted for rotation on the shaft M1 is the stator 11S of the wound-rotor induction motor 11. The rotor 11R of the induction motor 11 drives the constant-speed output shaft M2 upon which is mounted the rotor 62R of the A.C. generator 62. Also, the resistor 37 for controlling the speed of the induction motor 11 is mounted on the shaft M2. It can be seen from this and the more detailed description below that with this arrangement all electrical connections are made between stationary parts or between parts that rotate together. This eliminates all brushes and slip rings.

Figure 2:
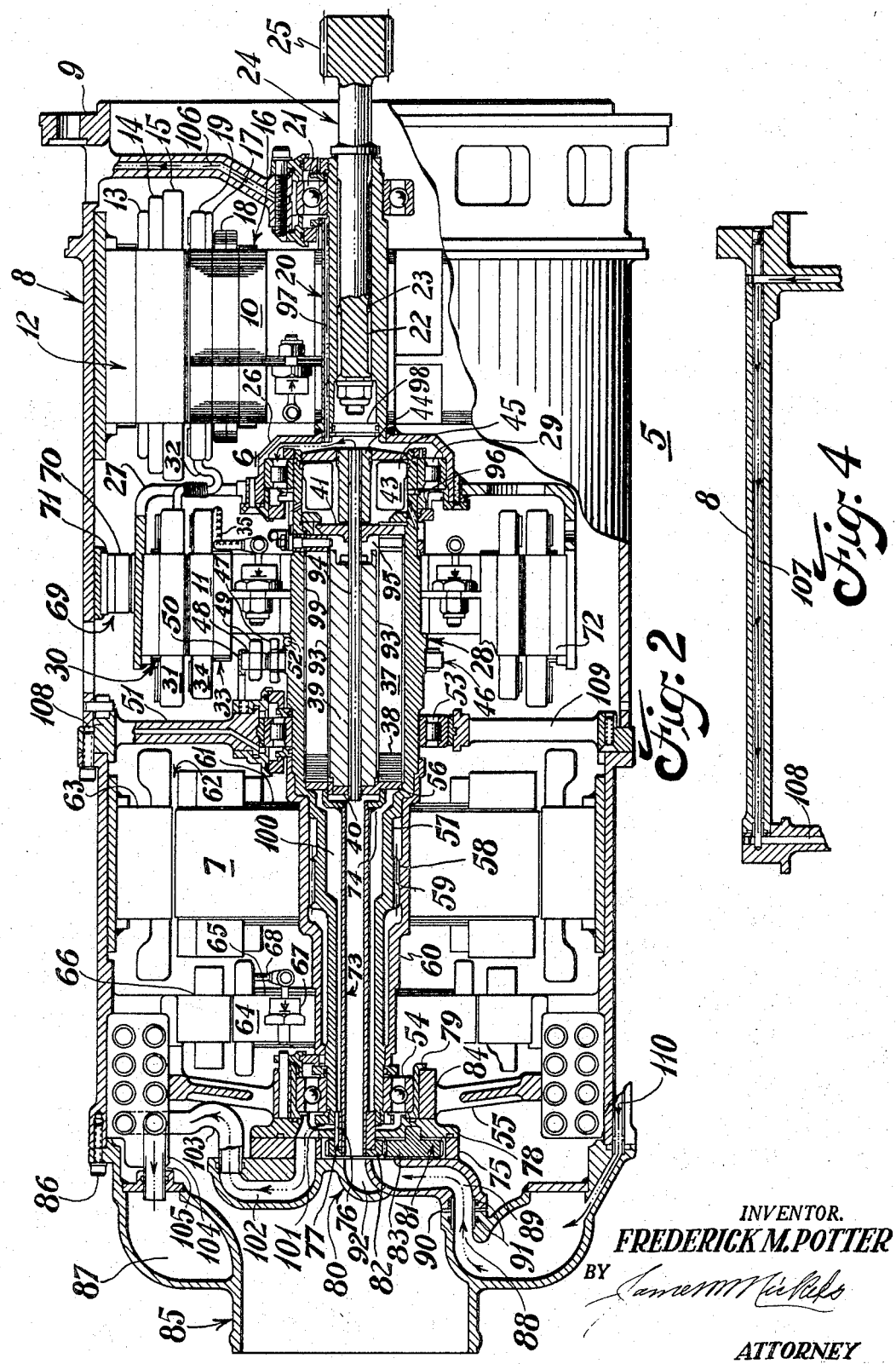
FIGURE 2 is a sectional view of a constant-frequency generating system embodying the invention.
Figure 3:
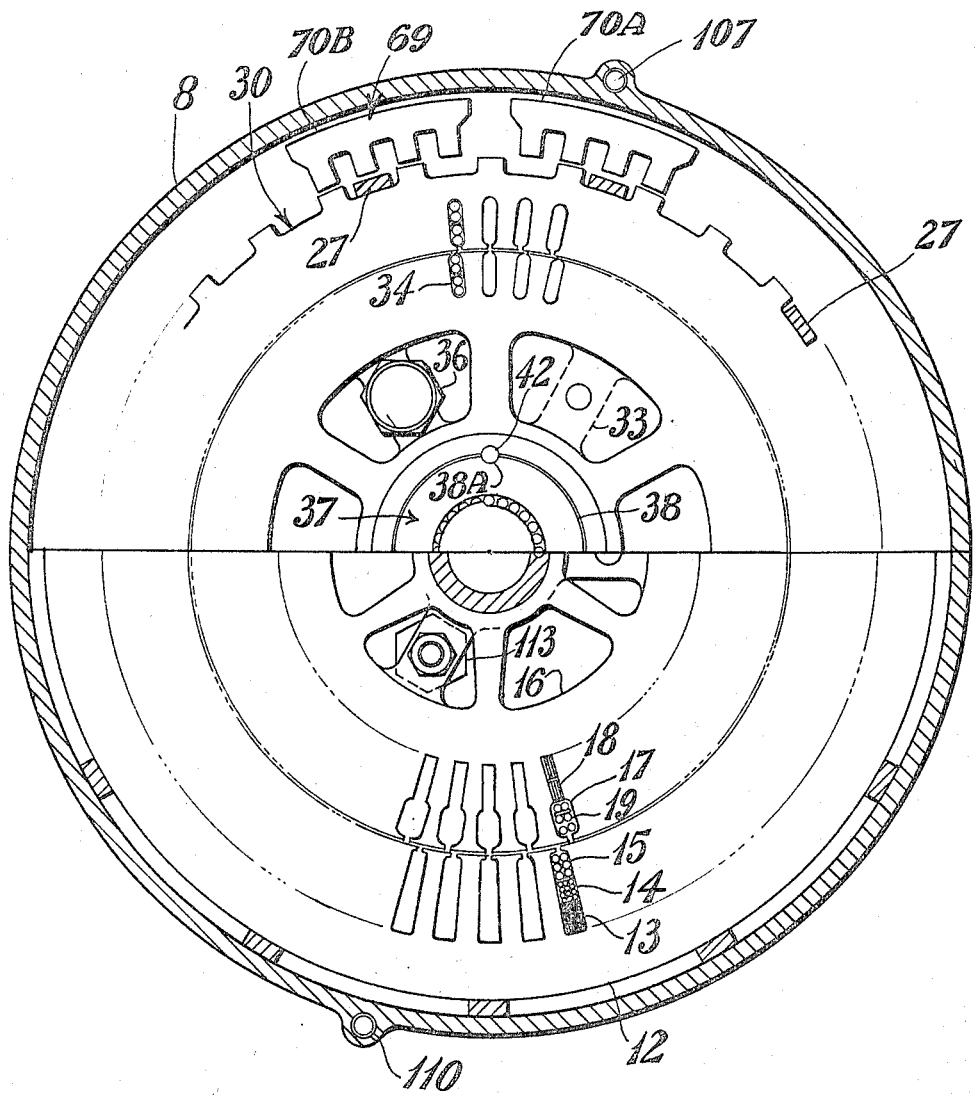
FIGURE 3 is a sectional end view of the device of FIGURE 2.

FIGURES 2, 3 and 4 show the mechanical construction and FIGURE 5 the electrical circuit. The dynamoelectric machine is indicated generally by the numeral 5 and includes basically a drive section 6 and a generator section 7 enclosed in a housing 8. The machine 5 has a mounting flange 9 on the housing 8 which is adapted for connection with a driving source, such, for example, as an aircraft engine (not shown).

The drive section includes generator 10 for supplying energy to the induction machine 11. This generator 10 is a combination of input generator 10a and power supply device 4 of FIG. 1.

The generator 10 has a stator 12 mounted in the housing 8 in a conventional manner. The stator 12 has a plurality of windings, as an example, a ten-pole field winding 13, a four-pole armature winding 14 and an eight-pole primary winding 15, whose functions are explained below. Adjacent to the stator 12 and in operative relationship thereto is a rotor 16 which also has a plurality of windings, for example, a ten-pole armature winding 17, a four-pole field winding 18 and an eight-pole secondary winding 19, the functions of which will be explained later. It will be understood that the numbers of poles of the rotor and stator windings may be selected with differing values, to accomplish those functions. The rotor 16 is mounted on a hollow shaft 20, one end of which is mounted for rotation in the housing 8 by means of bearing 21. The shaft 20 has internal splines 22 adapted to mate with external splines 23 on a shaft 24. The shaft 24 has a splined section 25 adapted for engagement with a driving source (not shown).

The other end of the shaft 20 terminates in a cup-like section 26 to which is attached a spider or arms 27. The section 26 is mounted for rotation on a shaft 28 by bearing 29. Secured to the spider 27 is a stator 30 of the induction machine 11. The stator 30 has a winding 31 which is connected by conductors 32 to the winding 19 of the generator 10. Adjacent to the stator 30 and in operative relationship therewith is a rotor 33 which is mounted on the shaft 28. The rotor 33 has a winding 34 which is connected by conductors 35 to the input of rectifiers 36 mounted on a section of rotor core 33. Illustratively, windings 31 and 34 may be 14 pole, three phase windings. The output from the rectifiers 36 is connected across the carbon pile resistor 37 positioned in the shaft 28. The resistor 37 therefore rotates with the winding which feeds it, constituting one novel feature of the invention.

The carbon pile resistor 37 has a stack of carbon pile discs 38 mounted within the bore of the shaft 28 and spaced therefrom by insulating rods 42 (see FIGURE 3) positioned in recesses 38A in the carbon pile discs 38. An insulating cylinder 39 is positioned inside the disc 38. The pressure on the pile 38 is controlled by an electromagnet 43. The electromagnet 43, in addition to the armature 41, includes a core 44 and a winding 45. Power for the winding 45 is obtained from a small generator 46.

The generator 46 has an armature 47 mounted on the shaft 28. Adjacent to the armature 47 and in operative relationship therewith is a stator 48, for the generator 46, and having a field winding 49 thereon. The stator 48 is supported by brackets 40 extending from spider 51 mounted in the housing 8. The field winding 49 is controlled by a frequency regulator as will be explained in detail later. A conductor 52 connects the output of the generator 46 to the winding 45 as will be explained in more detail later.

The shaft 28 is mounted for rotation by bearing 53 in the spider 51 and bearing 54 in end spider 55. A shoulder 56 is formed by a stepped-down section 57 of the shaft 28. The shoulder 56 serves to position the carbon pile resistor 37 in the shaft 28. On the stepped-down section 57 of the shaft 28 are external splines 58 adapted to mate with internal splines 59 of a shaft 60 which telescopes over a portion of the shaft 28.

Mounted on the shaft 60 is the rotor 61 of a generator 62. Adjacent to the rotor 61 and in operative relationship therewith is a stator 63 secured in the housing 8. The generator 62 may be a brushless A.C. generator adapted to be driven at a constant speed for a predetermined frequency, as an example, an 8000 r.p.m., 400 cycle, machine. It is understood, however, that other types and speed ranges could be utilized.

Excitation for the generator 62 is obtained from an exciter 64 which has an armature 65 mounted on the shaft 60. Mounted in the housing 8 and located in operational relationship with the armature 65 is a stator 66. The output from the armature 65 is connected through rectifiers 67 and conductor 68 to the rotor 61 of the generator 62.

Excitation for the exciter 64 is obtained from a special permanent-magnet type inductor alternator 69. The inductor alternator has two stator sections 70 secured in the housing 8. Each stator section 70 has an output winding 71 thereon, wound upon respective fixed permanent magnets 70A, 70B shown in FIGURE 3. Rotating poles 72 are part of the punchings of the stator 30 of the induction machine 11. The output of one section 70 is rectified and connected through a voltage regulator to the stator 66 of the exciter 64. The output of the other section 70 is used for and controlled by the frequency regulator as will be explained later.

Another novel feature of the invention is the means for removing the heat from the carbon pile resistor 37 by flowing oil through and around the carbon pile 38. A tube 73 has a flared end section 74 adjacent to the plate 40 of the carbon pile resistor 37. The tube 73 extends from the plate 40 through the section 57 of the shaft 28 into a pump housing 75. A bushing 76 having a plurality of ribs 77 thereon positions the tube 73 in the section 57 of the shaft 28. The pump housing 75 is positioned by a plate 78 which pilots on bearing clamps 79 of the bearing 54 in the spider 55. The plate 78 serves as an enclosure for one side of the pump housing 75. An end cap 80 serves as the enclosure for the other side of the pump housing 75. A gear pump 81 is mounted in the housing 75 and has a driving gear 82 mounted on the bushing 76 which is rotated by the ribs 77 of the bushing 76. A driven gear 83 is mounted in operative relationship with the gear 82 by a pin 84 extending into the plate 78. The end cap 80, gear housing 75 and plate 78 are secured to the spider 55 of the housing 8 by bolts (not shown) to form a unitary structure.

An air spout 85 is secured to the housing 8 by bolts 86. The air spout 85 includes an oil reservoir 87 which is in the form of an annulus compartment. The oil reservoir 87 has an opening 88 opposite a channel 89 in the end cap 80. A coupling member 90 joins the opening 87 with the channel 89. Oil seals 91 are provided on both sides of the coupling member 90. The channel 89 in the end cap 80 extends to and opens into the pump housing 75. Another channel 92 in the end cap 80 extends from the pump housing 75 to the tube 73.

Oil is drawn from the reservoir 87 by the pump 81 and expelled through the channel 92 into the tube 73. From the tube 73 a portion of the oil flows through channels 93 along the inner diameter of the carbon pile 38 to an opening 95 adjacent to the armature 41. The remainder of the oil flows through a tube 94 which extends through the insulating cylinder 39 and the armature 41 and core 44 of the solenoid 43 into the interior of the cup-like section 26 of the shaft 20. From the interior of the section 26 a portion of the oil flows through the bearing 29 and through openings 96 in the shaft 28 to passages 99 on the outside diameter of the carbon pile 38 where it is joined by the oil from the opening 95. From the passages 99, the oil passes through openings 100, between the shafts 28 and 73, from which the oil then passes through channels 101 and bearing 54 to a channel 102 in the end cap 80. The channel 102 is connected by a tube 103 to a heat exchanger 104 secured in the housing 8. From the heat exchanger, the oil passes back to the reservoir 87 by means of a coupling member 105.

The remainder of the oil from the tube 94 flows through a channel 97 in the shaft 20 to the bearing 91. A baffle 98 is provided to prevent the oil from entering the inside of the shaft 20. The oil from the bearing 21 continues through a channel 106 in the mounting flange 9 of the housing 8, and through channel 107 in the housing 8, see FIGURE 3. The channel 107 connects with a channel 108 in the spider 51. From the channel 108, the oil passes through the bearing 53 and into a channel 109 in the spider 51. The channel 109 connects with a channel 110 in the housing 8 with the channel 110 terminating at the reservoir 87.

Reference is now made to FIGURE 5 in order to explain the invention wherein the same reference numerals have been assigned to similar parts as in FIGURES 2, 3 and 4. In this figure, all elements within the dotted rectangle marked M1 rotate at the variable input speed; all elements within the dotted rectangle M2 rotate at the constant output speed; and the remaining elements are stationary. The generator 10 includes the stator 12 having a plurality of windings 13, 14 and 15. As an example, the winding 13 may be a ten-pole field winding, the winding 14 a four-pole armature winding and the winding 15 an eight-pole primary winding. The winding 13 is energized from direct current controlled by a frequency regulator 111 which is connected by conductors 112A, 112B and 112C to the output winding 63 of the generator 62. The frequency regulator 111 may be of the type which produces an error signal in a direction and magnitude dependent upon the deviation from a predetermined frequency. One such type is that described and claimed in U.S. Patent 3,060,366. The winding 13 produces A.C. power in the armature winding 17 which for purposes of illustration may be a 10-pole winding. The power generated in the armature winding 17 is rectified by rectifiers 113 and connected to energize the field winding 18 which illustratively be a four-pole winding.

The winding 18, when energized, produces A.C. power in the stationary armature winding 14 which illustratively may be a four-pole winding. The output from the winding 14 is connected by one circuit through a frequency-sensitive switch 114 to the stationary winding 15 which illustratively may be an eight-pole winding. The output from the winding 14 is also connected by another circuit through a full-wave rectifier 115 and the switch 114 to the winding 15. The circuit of switch 114 is described below with relation to FIGURE 6. Its function is to change the input to winding 15 in correspondence with respective input speed ranges; in the present instance, three different inputs are supplied to winding 15.

Windings 15 and 19 are respective polyphase windings, of like numbers of poles (illustratively, 8 poles). In such a machine, excitation of winding 15 by polyphase power of a given frequency will produce a rotating magnetic field, rotating at a speed which is the ratio of the frequency and the number of pole-pairs. Thus, for an eight-pole winding excited at 60 cycles per second, the field rotates at a speed of 15 revolutions per second, or 900 r.p.m. If the winding 19 were stationary, this rotating field would induce in winding 19 corresponding currents of the same frequency (60 cycles per second). However, if winding 19 rotates in the opposite direction from that of the field rotation, then the output frequency will be the input frequency (60 cycles per second) increased by an amount equal to the rotational speed multiplied by the number of pole-pairs. Conversely, if the field rotates in the same direction as that of winding 19, the output frequency will be decreased by the same amount. On the other hand, if the winding 15 is excited by direct current, then the output frequency from winding 19 will be equal to its speed times its number of pole-pairs. The frequency-sensitive switch 114 determines which of these situations occurs here, by reversing the phase-rotation of the excitation of winding 15 (and thus the direction of rotation of the field), or by substituting D.C. excitation.

Since the output of winding 14 will have a frequency equal to the input speed ($S_i$) times its pole-pairs (illustratively, four,) in the first case, where frequency is added, the output frequency from winding 19 will be $2S_i$ plus $4S_i$, or equivalent to six pole-pairs (twelve poles). Where the frequency is subtracted, the output will be $4S_i$ less $2S_i$, or equivalent to two pole-pairs (four poles). Where direct current is used for excitation, the frequency will correspond to eight poles.

Upon the input speed of the rotor 16 being in a first predetermined range, for example, between 4000 and 4800 r.p.m., the switch 114 connects the four-pole armature winding 14 to the stationary eight-pole winding 15 with phase-rotation to add frequency so that the output of the eight-pole rotor winding 19 is of a frequency equivalent to twelve poles. When the input speed reaches the upper limit of the speed range (in this example, 4800 r.p.m.) the switch 114 is activated to disconnect the winding 14 from the winding 15 and reconnect the winding 14 through the rectifier 115 and switch 114 to the winding 15. The output from the winding 14 is now connected through the rectifier 115 to the winding 15 which is connected in single-phase fashion to make a distributed D.C. field. Thus this makes an eight-pole generator out of this winding and the frequency generated in the winding 19 will be that of an eight-pole machine. After the input speed reaches a further predetermined point (for example, 6000 r.p.m.) another switching operation occurs. The output of the winding 14 is disconnected from the rectifier 115 and reconnected through the switch 114 with the phase-rotation reversed from the first situation so that the output frequency of the winding 19 corresponds to the difference between 8 and 4 poles, namely, 4 poles. This condition is maintained for speeds above the 6000 r.p.m. level. Upon a reduction in speed the steps are reversed. Thus winding 19 produces three different frequency ranges. In the example given, for input speeds from 4000 to 4800 r.p.m., the frequency will range from 400 to 480 cycles per second. For input speeds from 4800 to 6000 r.p.m., the frequency will be from 320 to 400 cycles per second, while for input speeds from 6000 up, the frequency will be 200 cycles per second and up. Thus as the speed goes up, for each step the frequency is dropped back, so that the average frequency for each step becomes lower as the speed becomes higher.

The output from the winding 19 is connected by the conductors 32 to the winding 31 of the induction machine 11. The winding 31 is mounted for rotation with the stator 16 of the generator 10 and is the stator 30 of the induction machine 11. The induction machine 11 is essentially a wound-rotor induction motor. If its stator 31 were stationary, and under no-current condition in its rotor, the rotor would be driven at a speed essentially equal to that corresponding to the frequency of excitation of winding 31 (namely, the frequency divided by the pole pairs). In the case of the stationary stator this is called the synchronous speed, and the actual rotor speed is less than the synchronous speed by an amount called the "slip," which depends upon the mechanical load upon the rotor and the resistance in its circuit. Where, as here, the stator 31 is rotated at the input speed, both the synchronous speed and the rotor speed are either increased or decreased by the same amount.

The winding 31 is connected in such a manner to cause the rotor 33 to run faster than the stator 30, so that the synchronous speed is increased by the input speed.

The frequency of the electrical power applied to the winding 31 is such that within the slip characteristics of the machine 11 a predetermined output speed can be obtained at all times, for example, 8000 r.p.m. For the above example, for an input speed from 4000 to 4800 r.p.m., the frequency produced would be from 400 to 480 c.p.s., giving a stationary synchronous speed of 4000 to 4800 r.p.m., and a synchronous speed of 8000 to 9600 r.p.m. By varying the slip from zero to 1600 r.p.m., the output speed is maintained at 8000 r.p.m. Hence, the slip will vary from 0 to 16.7% of the synchronous speed. For the second input speed range of 4800 to 6000 r.p.m., the frequency would be 320 to 400 c.p.s., giving a stationary synchronous speed of 3200 to 4000 r.p.m. and an actual synchronous speed of 8000 to 10,000 r.p.m. By varying the slip from zero to 2000 r.p.m. (or 0 to 20% of synchronous speed), the constant output speed of 800 r.p.m. is attained. For an input speed range of 6000 to 7500 r.p.m., the frequency would range from 200 to 250 c.p.s.; the stationary synchronous speed would be 2000 to 2500 r.p.m., giving a synchronous speed of 8000 to 10,000 r.p.m., and requiring slip of zero to 2000 r.p.m. (or 0 to 20%) for uniform 8000 r.p.m. output speed. Thus, the amount of slip is kept below 20% despite an input speed range of 4000 to 7500, or a speed increase of 87.5%.

Since the speed of a wound-rotor induction machine can be varied by controlling resistance in the rotor circuit, the output of the winding 34 is connected by conductors 35 through the rectifiers 36 across the carbon-pile resistor 37. The resistance of the carbon pile resistor 37 is varied by means of the electromagnet 43 which is energized through rectifiers 116 and conductors 52 from the output of the winding 47 of the generator 46. The winding 47 is excited by the field winding 49 of the generator 46. The winding 49 is energized from the frequency regulator 111 in accordance with the output frequency of the generator 62.

Power for the frequency regulator 111 is obtained from the winding 71A of a permanent-magnet generator 69. The rotating poles 72 are part of the stator punchings of the stator 30 of the induction machine 11. The speed or frequency-sensitive switch 114 is also connected to the output of the winding 71A and is operable to perform the switching functions in accordance with the output frequency of the winding 71A and hence in accordance with the input speed, to which the frequency is proportional.

The winding 71B of the PM generator 69 is connected by conductors 117 to energize a voltage regulator 118. The regulator 118 is connected by conductors 119 to the output of the generator 62 to control the energization of the winding 66 of the exciter 64 in accordance with the output voltage of the generator 62. Energization of the winding 66 causes electrical energy to be induced in the winding 65. The output from the winding 65 is rectified by rectifiers 67 and is connected by conductors 120 to energize field winding 61 of the generator 62 which in turn induces electrical energy in the winding 63 of the generator 62.

By the aforenoted arrangement the rotor 33 of the induction machine 11 will have a constant predetermined output speed, for example, 8000 r.p.m., by controlling the slip characteristics. Control of the slip is obtained by varying the resistance in the rotor circuit. Further control is obtained by a change in level of the applied voltage of the induction machine 11. Thus the frequency regulator 111 controls the resistance of the carbon pile resistor 37 and also the energization supplied to the stator winding 13 of the frequency supply generator 10 in accordance with the output frequency of the generator 62.

Basically the generator 10 can be considered as three separate machines; the ten-pole field winding 13 and the ten-pole armature winding 17 from one machine which is an exciter for the second; the four-pole field winding 18 and four-pole armature winding 14 form a second machine which is the frequency generator; and the eight-pole primary winding 15 and 8-pole secondary winding 19 form the third which is a rotary transformer and power supply for the induction machine. By having different numbers of pole-pairs there is no interaction between the respective machines.

For an explanation of switching for obtaining the different frequencies for different speeds, reference is made to the schematic diagram of FIGURE 6. The three windings 14A, 14B and 14C forming winding 14 are connected respectively by conductors 121A, 121B and 121C and conductors 122A, 122B and 122C to the corresponding terminals 123A, 123B and 123C of a three-pole switch 123, and also to the corresponding terminals 124A, 124B and 124C of a second three-pole switch 124. It is to be noted that the switch members 124B and 124C are transposed with reference to the switch members 123B and 123C. A conductor 125A connects the other side of the switch member 123A to the other side of the switch member 124A. Conductor 125B connects the other side of switch member 123B to the other side of switch member 124C and a conductor 125C connects the other side of the switch member 123C to the other side of the switch member 124B. The conductors 125A, 125B and 125C are connected respectively by conductors 126A, 126B and 126C to the three windings 15A, 15B and 15C, forming winding 15. The winding 15A is connected to the junction of the windings 15B and 15C by conductor 127, switch member 128C and conductor 129.

The input of rectifier 115 is also connected to conductors 121A, 121B and 121C. One side of the output of the rectifier 115 is connected by conductor 130 to one side of switch member 128A. The other side of the switch member 128A is connected by conductor 131 to the conductor 125A. The other side of the output of the rectifier 115 is connected by conductor 132 to one side of switch member 128B. The other side of the switch member 128B is connected by conductor 133 to the conductor 125C. Also another contact on switch member 128C is connected by conductor 134 to conductor 125A.

For one speed range, for example, 4000 to 4800 r.p.m., switch members 123A, 123B and 123C will be in a closed position, as illustrated. This connects the output from the four-pole winding 14 to the eight-pole winding 15, in a phase-rotation to make a frequency output equivalent to a 12-pole winding. When the speed is increased to the next range, for example 4800 to 6000 r.p.m., the switch 114 actuates the contacts 123A, 123B and 123C to the open position and closes switch members 128A and 128B. Also switch member 128C is actuated to disconnect conductor 129 and connect conductor 134 to conductor 127. This connects the winding 15 in single phase across the rectifier 115 to make a distributed D.C. field. This makes an eight-pole generator out of the winding and the frequency output is that of an eight-pole machine.

Upon a further increase in speed to another range, for example, 6000 to 7500 r.p.m., another switching operation will occur. The switch members 128A and 128B will be actuated to an open position and the switch member 128C will disconnect the conductor 129 from the conductor 134 and connect it to the conductor 127. Also switch members 124A, 124B and 124C will be actuated to a closed position to connect the output from the winding 14 in opposite phase-rotation to the eight-pole winding 15, thus providing a frequency equivalent to a four-pole winding.

It will be understood that switches 123, 124 and 128 are actuated at the speeds indicated by suitable speed-responsive means, which may be of conventional design, and whose details form no part of the present invention.

Although only three stages have been illustrated and described for supplying three different frequencies for three different speed ranges, it is understood that other arrangements of stages could be utilized. The reason for the different stages is to hold the slip losses to a minimum over the desired speed ranges. With a very small speed range only one stage could be utilized. Also other combinations of windings could be used as would be determined by the speed range and output frequency.

Thus the present invention provides a constant frequency and constant speed from a variable-speed source with virtually no wearing of parts. Being of a brushless configuration, there are no brushes to require frequent maintenance. No gearing is required. Also the low-pressure oil system provides lubrication for the bearings as well as removing heat from the carbon pile.

It will be apparent that windings 13 and 17, together with rectifiers 113, essentially provide DC excitation for the field winding 18. The excitation of winding 13 from the frequency regulator permits varying this excitation of winding 18 in response to the output frequency to aid in keeping that frequency constant. However, where this excitation variation is not necessary or deemed advisable, the system can be further simplified in that windings 13, 17 and 18 as well as rectifiers 113 may be eliminated, and in lieu thereof winding 14 may be made to cooperate with a permanent-magnet field. This may be similar in construction to the exciter 69.

It will be apparent that, in a general way, what the present device accomplishes is that when a value of slip is attained for which efficiency begins to be impaired, the system switches to a different frequency of excitation of the induction machine, which reduces the synchronous speed and hence the slip. In this instance the synchronous speed is made up of two components, one supplied by the input speed and the other supplied by the customary rotation of the field of induction machine 11 due to the frequency supplied to it. In effect, the actual synchronous speed of induction machine 11 is the sum of its stationary synchronous speed and the input speed, and the stationary synchronous speed is switched. Moreover, the system provides a particularly simple and novel way of providing the several frequencies required for this, from the same rotating machinery, by switching the phase-sequence or phase-rotation of the excitation of winding 15, or by switching from A.C. to D.C. excitation of that winding.

While the above arrangement for switching frequency is a preferred one, others may be used. For example, winding 14 may be arranged to yield different numbers of poles, either by having separate windings or switching among winding sections, and thereby yielding different frequency outputs to be correlated to the speed ranges in the manner already indicated.

Similarly, windings 66, 65 and 61 with rectifiers 67 provide a way of producing the required excitation for output generator 62, capable of voltage regulation by regulator 118. Where such regulation is not needed or desired, these elements may be replaced by a permanent-magnet field for generator 62.

Generator 62 is highly useful in aircraft as a source of constant 400-cycle voltage for the various instrumentations carried by aircraft, and serves also to provide the signal which is sensed by the frequency regulator 111. Where a constant speed is desired, without an electrical output, generator 62 (as well as its associated exciting apparatus, including elements 65, 66, 118 and 71B) may be replaced by any suitable speed-responsive frequency source for supply to regulator 111. Moreover, frequency regulator 111 itself may then be replaced by any suitable means for varying carbon-pile resistor 37 in response to the output speed.

Although only one embodiment of the invention has been illustrated and described in detail, various changes in the form and relative arrangement of the parts, which will now appear to those skilled in the art, may be made without departing from the scope of the invention.

What is claimed is:

1. A constant frequency generating system comprising an input generator having a rotor and a stator, an induction machine having rotor and a stator, mechanical means connecting the stator of said induction machine for rotation with the rotor of said input generator, electrical means connecting the output of said input generator to the stator of said induction means, an output generator having a rotor and a stator, other mechanical means connecting the rotor of said output generator for rotation with the rotor of said induction machine, and control means responsive to the output frequency of said output generator to control the excitation of said induction machine to cause the rotor of said induction motor to be driven at a predetermined speed.

2. A constant frequency generating system comprising a variable speed input generator, said input generator having a stationary field winding and a rotating armature winding, an induction machine having a stator winding and a wound rotor winding, said stator winding being mounted for rotation by said rotating armature winding, circuit means connecting the output of said rotating armature winding to the input of said stator winding of said induction machine, an output generator having a stator winding and a rotor winding, said rotor winding being mounted for rotation by said wound rotor winding, and means responsive to the output frequency of said output generator to vary the resistance of said wound rotor winding to cause said induction machine wound rotor winding to run at a predetermined speed.

3. A system for producing constant speed output from a variable speed input comprising a generator having a stator and a rotor winding, said rotor winding being adapted to be driven over a variable speed range, and an induction machine having a stator winding and a wound rotor winding, said stator winding being mounted for rotation with said generator rotor winding, circuit means connecting the output of said generator to said induction machine stator winding, and means including a variable resistor mounted on said wound rotor winding to control the resistance thereof to cause said wound rotor to run at a predetermined speed.

4. A constant frequency generating system comprising a brushless input generator having a stator and a rotor, said stator having a field winding, a multipole armature winding and a multipole primary winding, said rotor having an armature winding, a field winding and a multipole secondary winding, switch means responsive to the speed of said rotor winding for connecting said stator armature winding to said primary winding in one sense when said speed is below a predetermined value, and in another sense when said speed is above said predetermined value, an induction machine having a stator winding and a rotor winding, said stator winding being mounted for rotation with said input generator rotor, circuit means connecting the output of said secondary winding to said induction machine stator winding, a variable resistance mounted inside the induction machine rotor winding and connected in series therewith for ranging the resistance thereof, an output generator having a rotating field winding and a stator armature winding, said rotating field winding being mounted for rotation by said induction machine rotor, excitation means for said output generator rotating field winding, and means responsive to the output frequency of said output generator to control said variable resistance and thereby the speed of said induction machine wound rotor winding to provide a constant frequency output.

5. A constant frequency generating system comprising an input generator having a stator and a rotor, said stator and rotor having a plurality of corresponding windings, switch means for changing the connections between some of said stator windings in accordance with predetermined speed ranges of said rotor, an induction machine having a stator winding and a rotor winding, said stator winding being mounted for rotation by said input generator rotor, means for energizing said induction machine stator winding from the output of said input generator, a variable resistance connected in series with said induction machine wound rotor winding and mounted for rotation therewith, an output generator having a rotating field winding and a stationary output winding, said output generator field winding being connected for rotation by said induction machine wound rotor winding, a rotating exciter connected for energizing said output generator field winding, and means responsive to the output frequency of said output generator to control said variable resistance and the excitation of said induction machine.

6. A variable input constant frequency generating system comprising a variable speed input shaft, an exciter generator having a stator field winding and a rotor armature winding, said rotor armature being mounted on said input shaft, a frequency supply generator, said frequency supply generator having a rotating field winding mounted on said variable speed input shaft and a stator output winding, a rotating transformer having a stationary primary winding and a rotating secondary winding mounted on said variable speed input shaft, an induction motor having a stator winding mounted on said variable speed shaft and a wound rotor winding circuit means connecting the output of said secondary winding to the input of induction motor stator winding, an output shaft connected for rotation by said wound rotor winding, a variable resistance mounted on said output shaft, circuit means including rectifiers connecting said variable resistance in series with said wound rotor winding, an output generator having a rotating field winding mounted on said output shaft and a stator output winding, means responsve to the speed of said input shaft to connect said frequency supply generator to said rotating transformer to energize said induction motor in accordance with predetermined speed ranges of said input shaft, and means responsive to the output frequency of said output generator to vary the resistance of said variable resistance to maintain said output shaft at a predetermined speed.

7. A variable speed induction machine comprising a stator, a stator winding, an input to said stator winding, a rotor, a wound rotor winding, a variable resistance element mounted on said rotor, rectifying means connecting said variable resistance element in series with said wound rotor winding, and means for controlling the resistance of said variable resistance element to control the speed of said rotor, said means including generator having a stator winding and means for controlling the energization of said field winding.

8. A constant frequency generator system comprising a variable speed input generator, said input generator having a plurality of different pole pair windings, a wound rotor induction machine, switch means responsive to predetermined speed ranges to selectively connect said induction machine to the output of one of said pole pair windings, an output generator, and means responsive to the output frequency of said output generator to control the energization of said input generator and thereby the output speed of said induction machine.

9. The combination as set forth in claim 8 and including further means responsive to said output frequency for varying the resistance of the wound rotor of said wound rotor induction motor to provide a constant output speed thereof.

10. A constant frequency generator system comprising means for supplying a plurality of different frequencies for a corresponding plurality of predetermined speed ranges, an induction machine having a stator and a wound rotor, means for rotating said stator winding over said speed ranges, switch means responsive to said speed ranges for selectively connecting one of said frequencies in accordance with said speed ranges to energize said stator winding, an output generator, means connecting said output generator for rotation by said wound rotor, and means responsive to the frequency of said output generator to control the speed of said induction machine to provide a constant output speed therefrom.

11. The combination as set forth in claim 10 in which the means for controlling the speed of said induction machine is a carbon pile resistance.

12. A constant frequency generating system comprising an input generator having a stator and a rotor, said stator having a field winding, an armature winding and a primary winding, said rotor having an armature winding, a field winding and a secondary winding, rectifier means connecting said rotor armature winding to said rotor field winding, three position switch means responsive to the speed of rotation of said rotor to connect the output of said stator armature winding to said primary winding in phase addition when said speed is in one predetermined range, through rectifiers, when said speed is in a second predetermined range, and in phase opposition when said speed is in a third predetermined range, an induction machine having a stator winding and a wound rotor winding, said stator winding being mounted for rotation with said input generator rotor, circuit means connecting the output of said secondary winding to said induction machine stator winding, an output generator having a rotating field winding and a stator armature winding, means connecting said rotating field winding for rotation by said induction machine rotor winding, and means responsive to the output frequency to control the speed of said induction machine to provide a constant output frequency.

13. A constant frequency generating system comprising a frequency supply generator having a stator and a rotor, said frequency supply generator being adapted to produce a plurality of different frequencies for the same speed, an induction machine having a stator and a wound rotor, mechanical means for connecting said induction machine stator for rotation with said frequency supply generator stator, switch means responsive to the speed of said frequency supply generator stator to selectively connect said plurality of frequencies output to said induction machine stator in accordance with predetermined speed ranges, an output generator having a rotor and a stator, other mechanical means for connecting said output generator rotor for rotation by said induction machine rotor, and means responsive to the output frequency of said output generator to control the speed of said induction machine rotor to provide a constant frequency output.

14. The combination as set forth in claim 13 in which said induction machine speed control means includes a variable resistance element connected in series with said wound rotor.

15. A constant frequency generating system comprising a frequency supply generator having a stator and a rotor, said rotor being adapted to be driven from a variable speed source, a power supply, switch means responsive to predetermined speed ranges connecting said power supply for energization from said frequency supply generator in accordance with said speed ranges, an induction machine having a stator winding and a wound rotor winding, said stator winding being mounted for rotation with said frequency supply generator rotor, a carbon pile resistor connected in series with said wound rotor winding and mounted for rotation therewith, an output generator having a stator and a rotor, said output generator rotor winding being mounted for rotation by said wound rotor winding, and means responsive to the frequency of said output generator to control said carbon pile to maintain a constant output speed from said wound rotor.

16. The combination as set forth in claim 15 in which the means for controlling said carbon pile resistor is a generator having a stator field winding and a rotating armature winding, said armature winding being mounted for rotation with said wound rotor winding.

17. The combination as set forth in claim 15 and including means for circulating oil through said carbon pile resistor for cooling.

18. The combination as set forth in claim 15 and including means for circulating oil through said carbon pile for cooling and lubricating the bearings in said system.

19. A system for producing a substantially constant output speed from a variable input speed comprising
   (a) an induction machine having a pair of windings, each winding being separately rotatable,
   (b) means for rotating one of said windings at said input speed,
   (c) means for exciting said one winding at a frequency varying with said input speed, and
   (d) means responsive to the speed of the other of said windings for varying the loading of said other winding to keep its speed substantially constant.

20. A system as in claim 19 further including means to shift said frequency in response to change of said input speed from one range to another.

21. A system as in claim 19 further including means responsive to change of said input speed from a lower range to a higher range for changing the frequency of excitation of said one induction-machine winding from a first range corresponding to said lower speed range to a lower frequency range corresponding to said higher speed range.

22. A system as in claim 21 wherein said speed-responsive means comprises
   (i) a polyphase input generator having a rotor rotating with said excited induction-machine winding and also having a stator winding,
   (ii) a polyphase rotary transformer having a stator winding electrically and mechanically coupled to said input-generator stator winding and having a rotor winding electrically and mechanically connected to said excited induction-machine winding, and
   (iii) means responsive to change of said input speed from one range to another for altering the phase-sequence of the connections of either said input-generator stator winding or said rotary-transformer stator winding.

23. A system as in claim 21 wherein said speed-responsive means comprises
   (i) a polyphase input generator having a rotor rotating with said excited induction-machine winding and also having a stator winding,
   (ii) a polyphase rotary transformer having a stator winding electrically and mechanically coupled to said input-generator stator winding and having a rotor winding electrically and mechanically connected to said excited induction-machine winding, and
   (iii) a rectifier, and
   (iv) means responsive to change of said input speed from one range to another for changing the connections of said rotary transformer stator from a polyphase winding to a single-phase winding and for interposing a rectifier between said input-generator stator winding and said rotary transformer stator winding.

24. A system for producing a substantially constant output speed from a variable input speed comprising
   (a) an induction machine having a pair of windings, each winding being separately rotatable,
   (b) means for rotating one of said windings at said input speed,
   (c) means for exciting said one winding at a frequency varying with said input speed, and
      (i) said means comprising a generator having a field winding rotating with said induction machine one winding at said input speed and an armature winding having its output coupled to said excited winding, 25. A system as in claim 19 wherein said speed-responsive means comprises an output generator driven by said other induction-machine winding to produce an output frequency corresponding to the speed thereof, a resistor connected to said other winding and rotating therewith, and means responsive to variations in said frequency for varying the resistance of said resistor to keep said frequency substantially constant.

26. A system for producing a constant speed output from a variable speed input comprising a generator having a stator and a rotor, said rotor being adapted to be driven over a variable speed range, and an induction machine having a stator winding and a rotor winding, said stator winding being mounted for rotation with said generator rotor winding, circuit means connecting the output of said generator to said induction machine stator winding, a variable resistor connected to said induction machine rotor winding, and means responsive to changes in speed of said wound rotor winding for varying said resistor to cause said induction machine wound rotor to run at a predetermined speed.

References Cited
UNITED STATES PATENTS
2,383,143   8/1945   Moore _____ 322—39 X
2,793,338   5/1957   Rhyne _____ 318—240 X
3,233,164   2/1966   Tyler _____ 322—29 X JOHN F. COUCH, *Primary Examiner.*

HAROLD HUBERFELD, *Assistant Examiner.*